Aug. 4, 1925.
P. D. PAULS
1,548,626
PAPER FOLDING MACHINE
Filed July 23, 1921   10 Sheets-Sheet 3
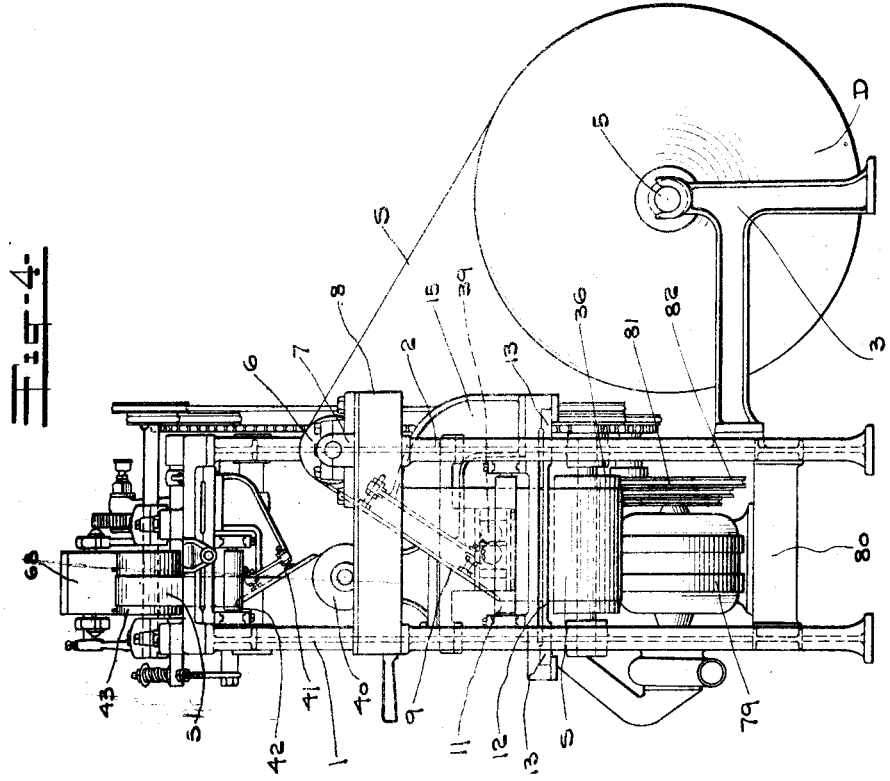
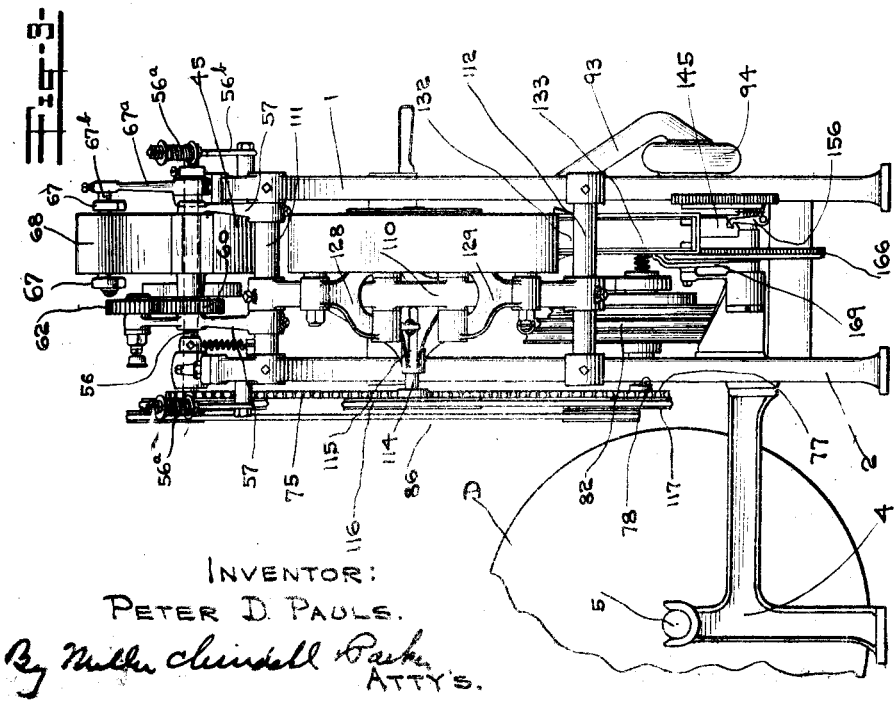
INVENTOR:
PETER D. PAULS.
By Miller Churchill Pack
ATTY'S.

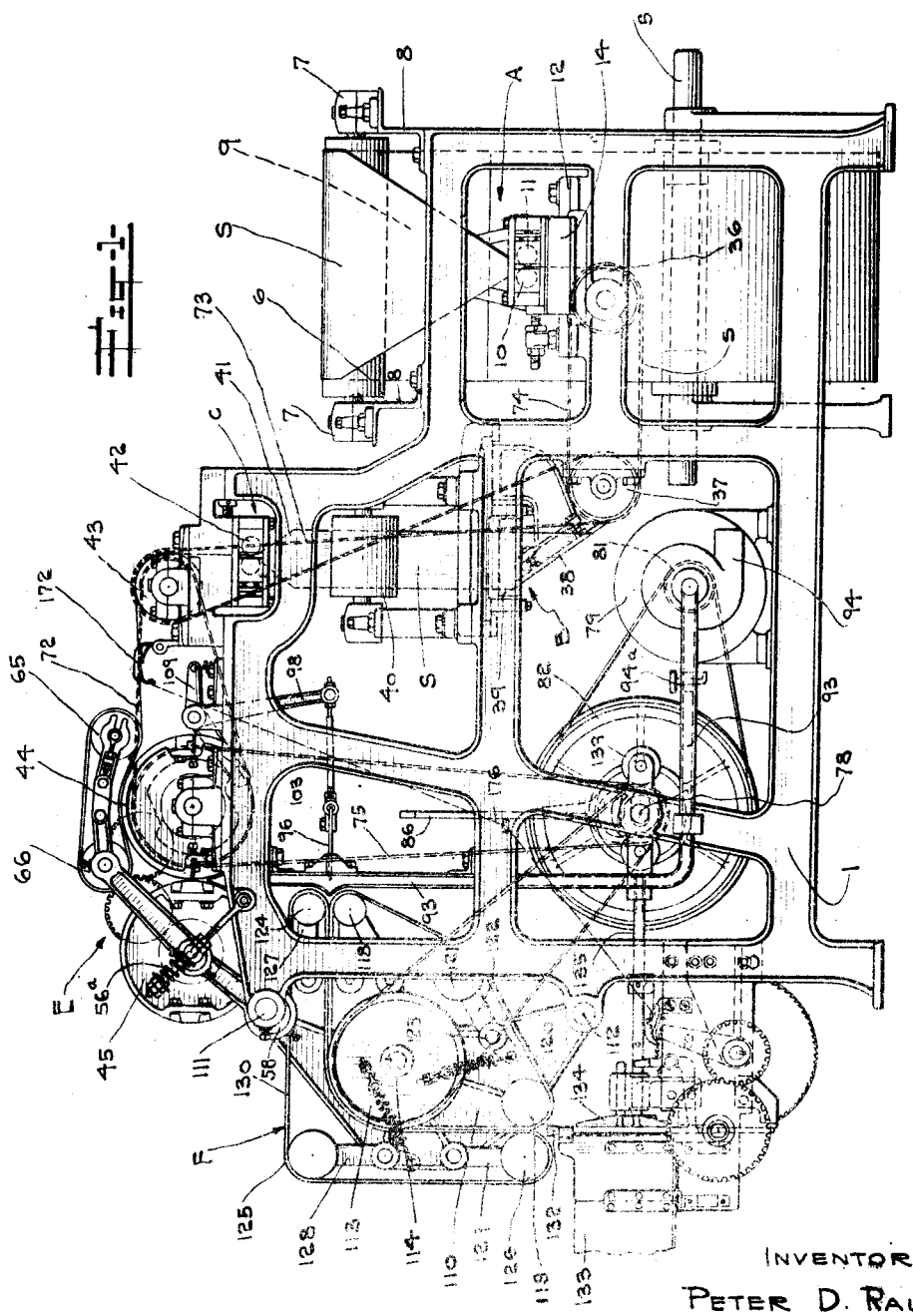

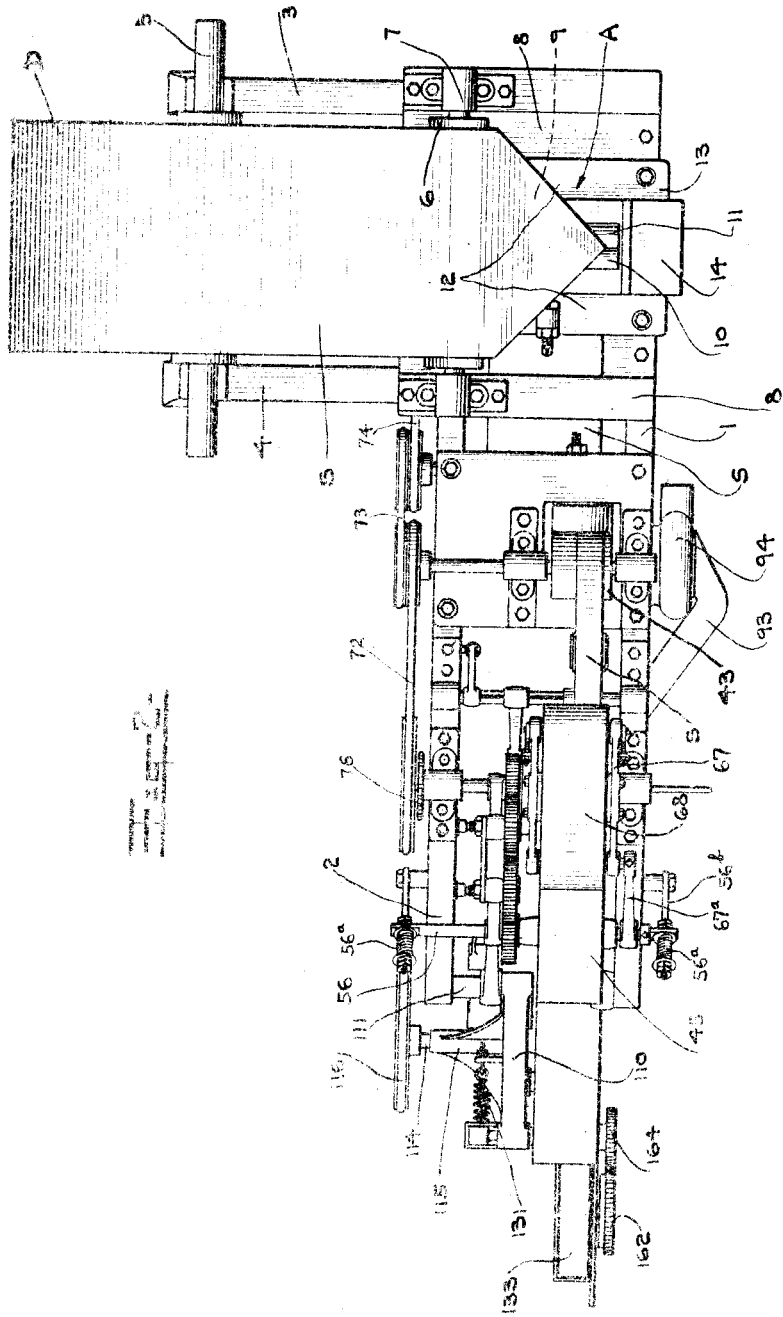

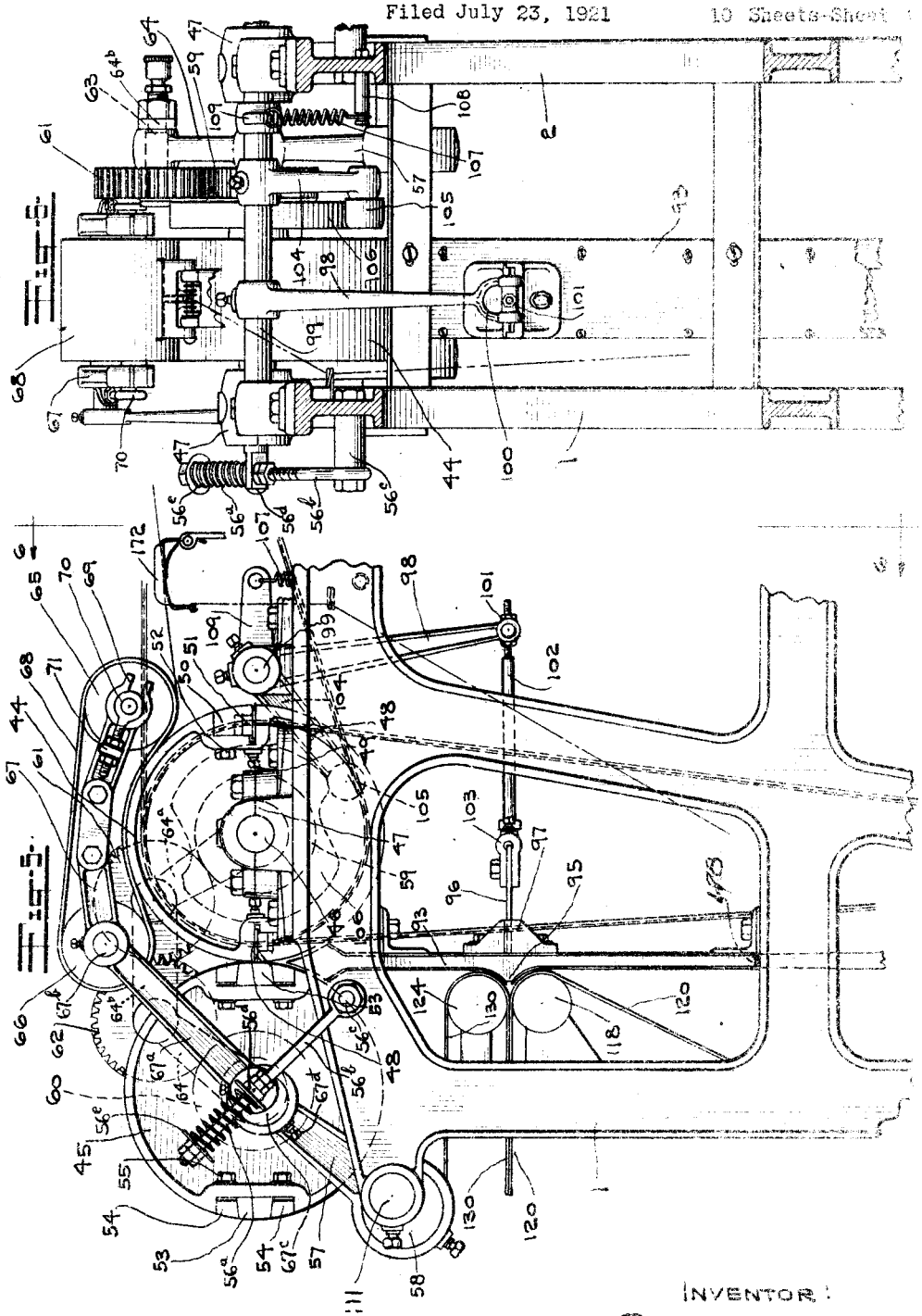

Aug. 4, 1925.
P. D. PAULS
PAPER FOLDING MACHINE
Filed July 23, 1921 10 Sheets-Sheet 5
1,548,626
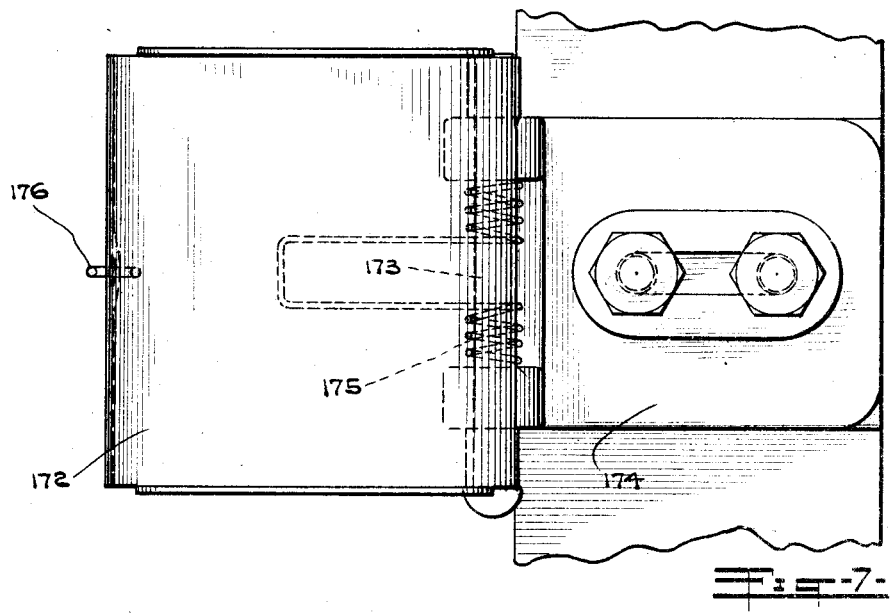
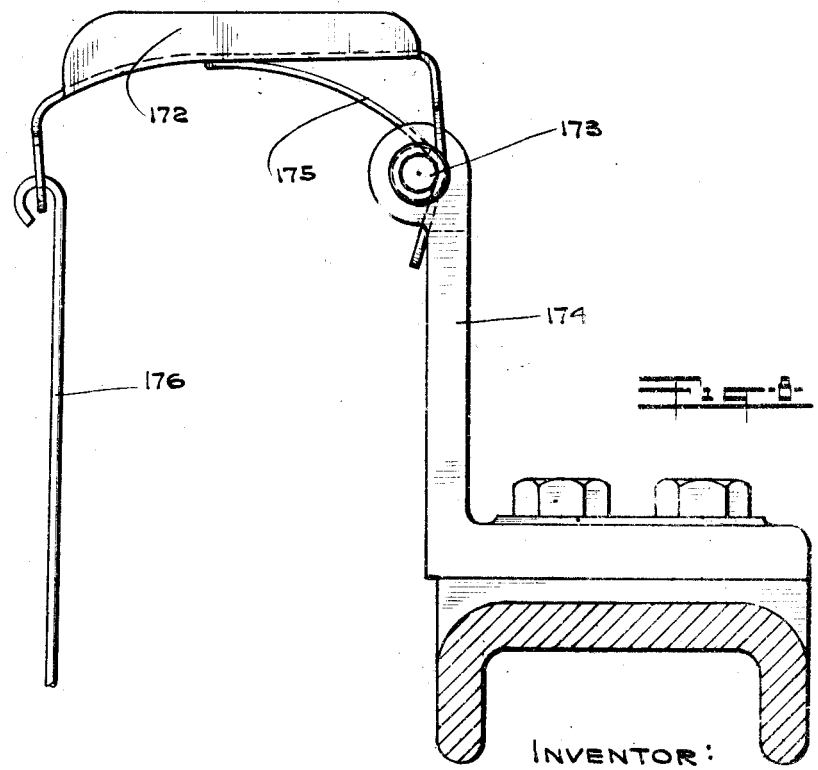
INVENTOR:
PETER D. PAULS.
ATTY's.

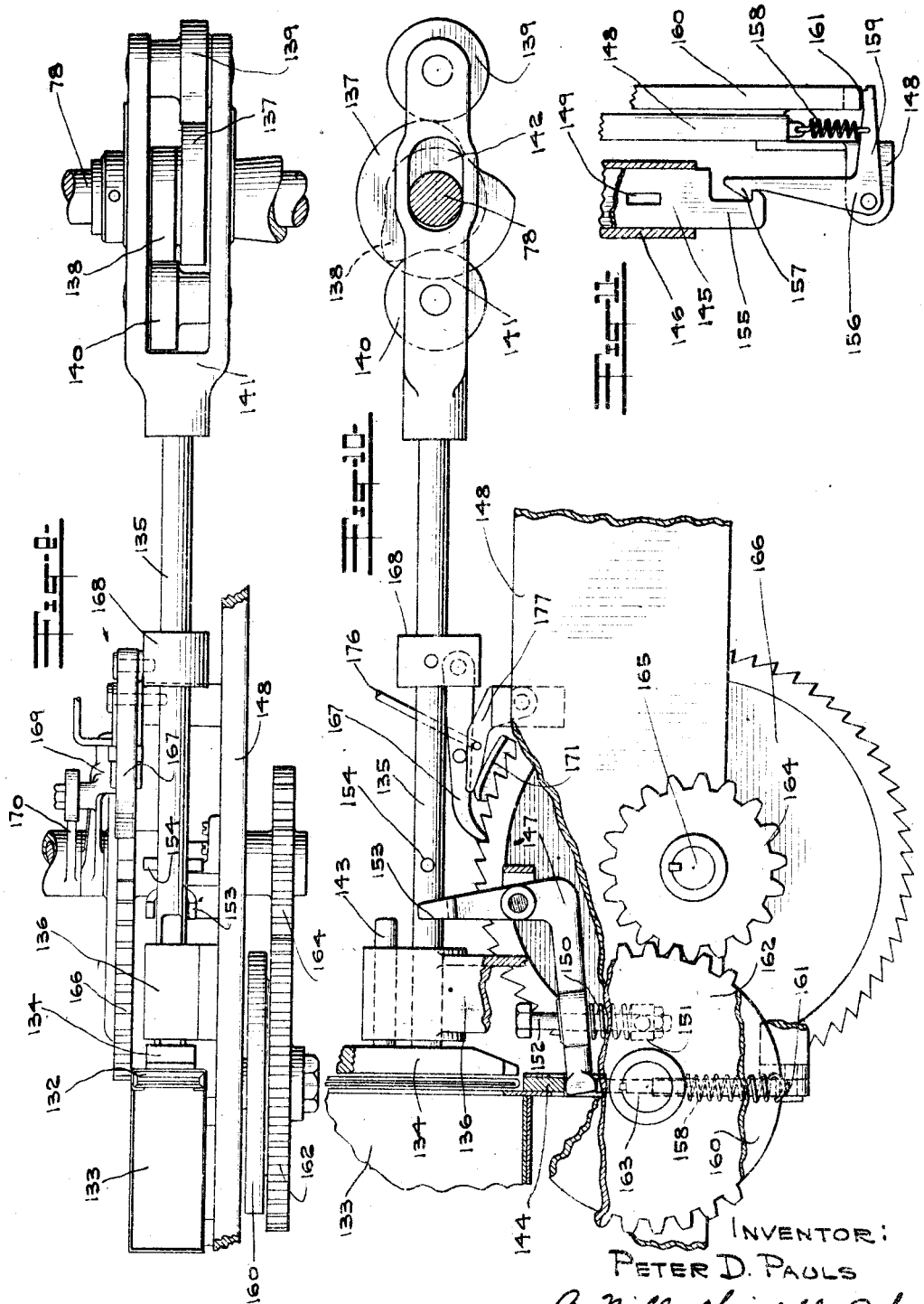

Aug. 4, 1925.
P. D. PAULS
1,548,626
PAPER FOLDING MACHINE
Filed July 23, 1921
10 Sheets-Sheet 7
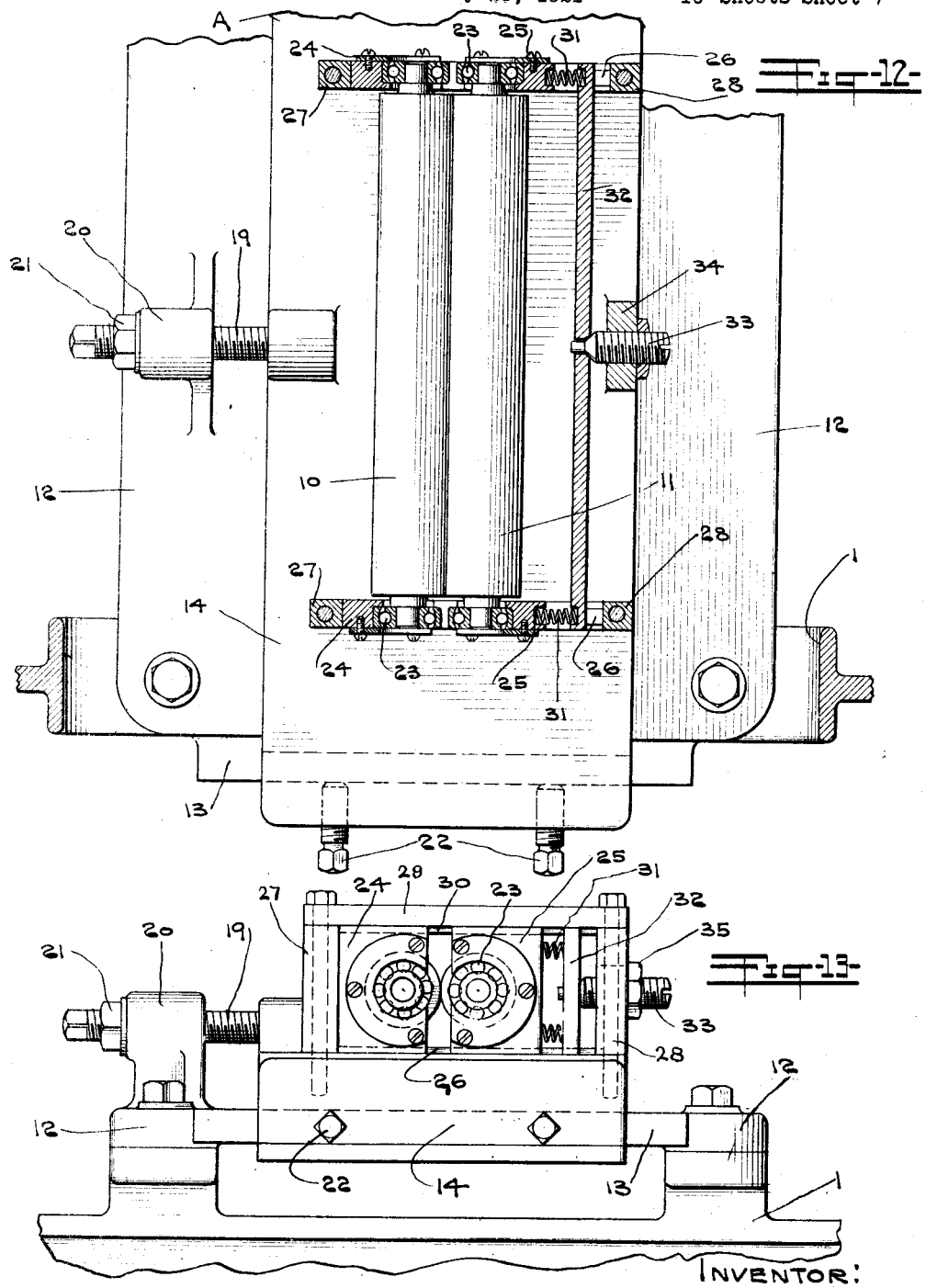
INVENTOR:
PETER D. PAULS
By Miller Churchill Parker
ATTY'S.

Aug. 4, 1925.
P. D. PAULS
1,548,626
PAPER FOLDING MACHINE
Filed July 23, 1921     10 Sheets-Sheet 8
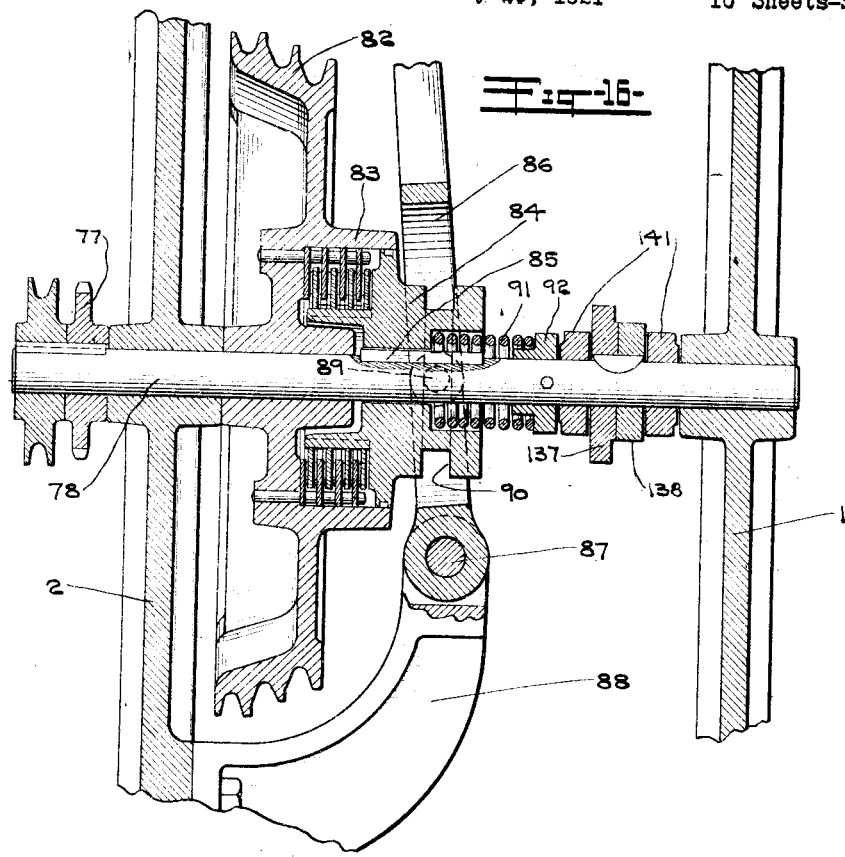
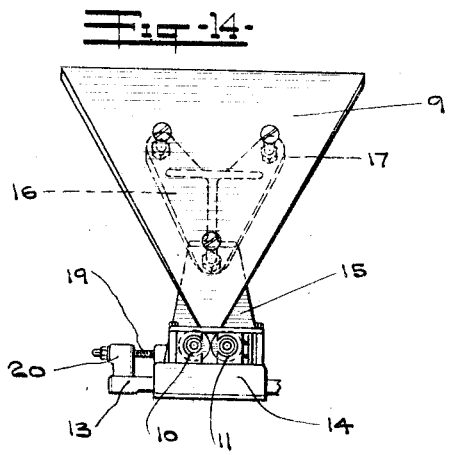
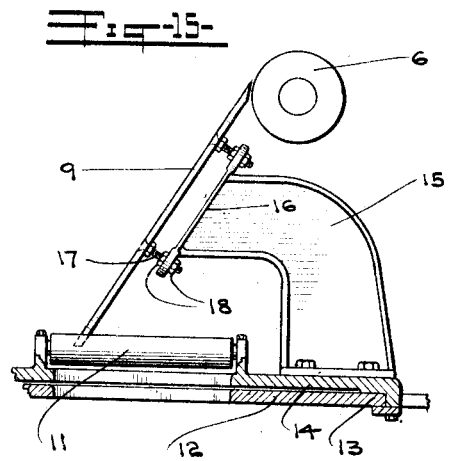
INVENTOR:
PETER D. PAULS.
By Miller Chadwell Parker
ATTY'S Aug. 4, 1925.

P. D. PAULS 1,548,626

PAPER FOLDING MACHINE

Filed July 23, 1921     10 Sheets-Sheet 9

INVENTOR:
PETER D. PAULS.
By Miller Churchill Baker
ATTY'S

Aug. 4, 1925.
P. D. PAULS
1,548,626
PAPER FOLDING MACHINE
Filed July 23, 1921
10 Sheets-Sheet 10
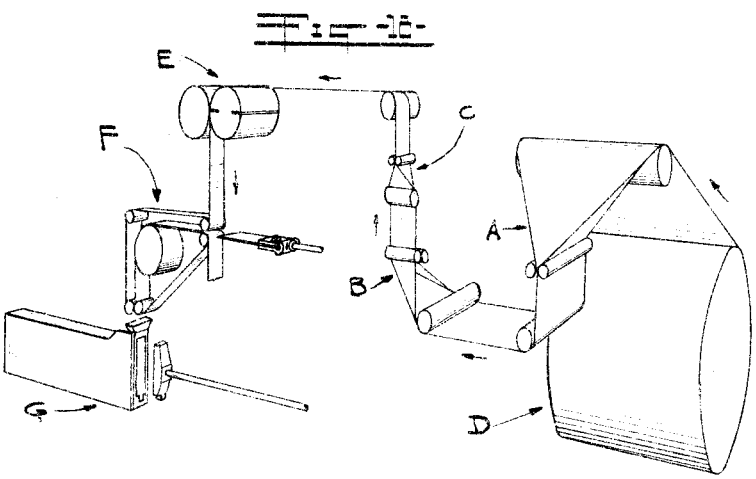
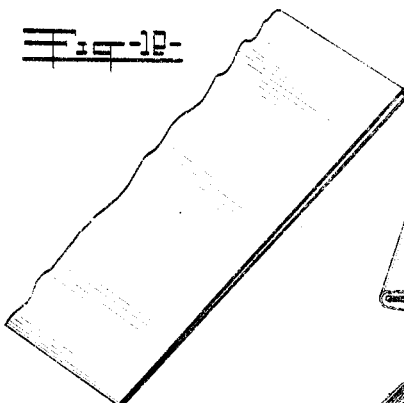
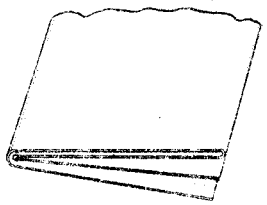
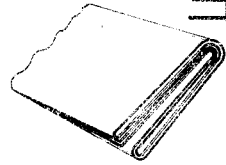
INVENTOR:
PETER D. PAULS.
ATTYS Patented Aug. 4, 1925.

1,548,626

UNITED STATES PATENT OFFICE.

PETER D. PAULS, OF CHICAGO, ILLINOIS.

PAPER-FOLDING MACHINE.

Application filed July 23, 1921. Serial No. 486,946.

*To all whom it may concern:*

Be it known that I, PETER D. PAULS, a citizen of the United States, residing at Chicago, in the county of Cook and State of Illinois, have invented certain new and useful Improvements in Paper-Folding Machines, of which the following is a specification.

The invention relates to paper folding machines and more particularly to a machine for folding, cutting and stacking paper napkins and similar articles made from sheet paper.

Heretofore such articles made from paper have been commonly cut into appropriate sized sheets and marketed without folding. The subsequent hand folding involved considerable labor and expense.

The primary object of this invention is to provide a machine which will expeditiously and economically fold and cut napkins and the like from a continuous roll of material.

Another object is to provide a machine with adjustable means for varying the position of the folds and the lengths of cut, to produce napkins of varied size and other articles such as table covers, towels and the like.

Another object is to construct the machine in such a manner that the paper material may be folded both longitudinally and transversely, cut to desired lengths and deposited in a suitable receptacle with a continuous forward movement of the material.

A further object is to provide means for stacking and counting the finished articles preparatory to their being packed in suitable containers for shipment.

Other objects and advantages include novel means for transversely folding and severing the partially cut units; for accomplishing a multiple of transverse folds; for adjustably tensioning and positioning the folding rolls; for providing positive uniform draft of the material through the machine; and control of the counting device, case of rupture of the material in process.

With the above objects in view, and with others hereinafter apparent, the invention comprises the novel features of construction and arrangement set out in the following detailed description of a preferred embodiment thereof and which are illustrated in the accompanying drawings.

Referring to the drawings, Figure 1 is a side elevation of the complete machine. Fig. 2 is a plan view of the machine, and Figs. 3 and 4 are elevations of its respective ends. Fig. 5 is a fragmentary side view showing the feed and cutting rolls, and the transverse folding mechanism. Fig. 6 is a sectional elevation taken on the line 6—6 of Fig. 5. Figs. 7 and 8 are plan and side views respectively of the guide shoe and counter releasing device. Figs. 9 and 10 are plan and side views respectively of the stacking and counting mechanism, and Fig. 11 illustrates a detail of the latter. Figs. 12 and 13 are plan and end views respectively of a pair of the adjustable folding rolls. Figs. 14 and 15 illustrate the adjustable mounting of the folding tables. Fig. 16 is a cross section of the clutch mechanism mounted on the main drive shaft. Fig. 17 is a side elevation of the delivery end of the machine illustrating a modified form adapted to make a plurality of transverse folds. Fig. 18 is a diagrammatic representation of the operations of the machine in producing napkins. Figs. 19 to 22 illustrate the successive folds made in a napkin.

The general organization of the machine, as illustrated diagrammatically in Fig. 18, includes three folding units, indicated at A, B and C, through which the material is drawn from the continuous roll D. The units A, B and C fold the paper longitudinally as illustrated in Figs. 19, 20 and 21, respectively, the stock passing from the unit C to the feed and cutting rolls E in a continuous band folded as in Fig. 21. The rolls E are arranged to partially cut the passing band of material into proper lengths. The band then passes before the transverse folding unit F comprising a pair of continuous belts operating at somewhat greater speed than the travel of the band of material and between which the sections of the band are folded by the periodic operation of a reciprocating blade. The increased speed severs the sections. The folded and severed napkins are then dropped into the stacking device G, being packed in a rear chamber by a reciprocating plunger. The device G includes a mechanism for raising each hundredth, or other recurring numbered napkin, above the position of the others so that the napkins may be counted in lots of like amount. The finished napkin as stacked ready for packing is shown in Fig. 22.

Referring to Figs. 1 to 4, inclusive, the operating mechanism is supported upon a pair of spaced skeleton frame members 1 and 2. A pair of laterally offset legs 3 and 4 carry in upwardly open bearings a shaft 5 upon which is revolubly mounted the continuous roll of paper D. The sheet paper S passing from the roll D is carried over a roller 6 journalled in bearings 7 mounted on a pair of cross rails 8 of the frame. The roller 6 guides the paper into the first of the folding units A, illustrated in detail in Figs. 14 and 15. The folding unit comprises a triangular folding table 9 positioned with its base closely proximate to the periphery of the roller 6, and with its apex immediately above and between a pair of folding rolls 10 and 11.

The inclination of the table relative to the axes of the rolls, and the angular relation between its converging sides smoothly accomplish the longitudinal folding of the paper as it passes over the table from the roller 6 and through the rolls 10 and 11. The paper is thus once folded upon a line determined by the position of apex of the table. In order to accurately adjust the inclination of the table, and to change the position of its apex for variation of the line of the fold, I have provided an adjustable mounting for the table and folding rolls 10 and 11.

The folding unit as a whole is supported upon a bed plate 12 (Fig. 15) secured to the frame members 1 and 2. The ends of the bed plate 12 form parallel ways 13 upon which is slidably mounted a carriage 14, as illustrated also in Figs. 12 and 13. The ways 13 are arranged parallel to the axis of the roller 6. An elbow support 15 fixed at one end of the carriage 14 is provided with a flanged end portion 16 inclined similarly to the folding table 9. A series of bolts 17 protruding from the back of the folding table are received through apertures in the flanges of the portion 16 and are provided with adjusting nuts 18 by means of which the relative inclination of the table 9 may be accurately adjusted.

The carriage and folding table may be shifted on the ways 13 by means of a screw 19 rotatably secured on one side of the carriage and having threaded engagement with a lug 20 fixed on the bed plate 12. (See Figs. 12, 13 and 14.) A lock nut 21 secures the screw against further rotation when the carriage is adjusted. Set screws 22 are also provided to secure the carriage in fixed position upon the ways.

The folding rollers 10 and 11 are mounted on the carriage 14 with their axes perpendicular to a vertical plane through the axis of the roller 6. The rolls are arranged for varying the tension between them so that the pressure necessary to properly fold the paper may be adjusted to varying thickness and quality of paper. The ends of the rolls are journalled in antifriction bearings 23 (Figs. 12 and 13) which are carried at each end by a pair of sliding blocks 24 and 25 mounted on ways 26 formed transversely of the upper surface of the carriage. A pair of upright posts 27 and 28 support a cross bar 29 at each end of the rolls, the cross bar also providing a slide way 30 for the upper ends of the respective bearing blocks. The sliding movement of the bearing blocks is controlled by pairs of tension springs 31 bearing laterally upon each of the bearing blocks 25 supporting the roller 11, and which are tensioned by means of a plate 32 extending longitudinally of the rollers and receiving the other ends of the springs 31 in suitable recesses. The bearing blocks 24 supporting the roll 10 are in abutment with the fixed posts 27. Movement of the plate 32 to vary the tension of the springs and consequently the pressure between the rolls 10 and 11, is accomplished by means of a set screw 33 threaded in a lug 34 fixed on the upper surface of the carriage. The set screw bears upon the plate 32 and may be locked in any adjusted position by means of a lock nut 35. Both the carriage 14 and the bed plate 12 are formed with apertures beneath the rolls 10 and 11 through which the paper material may pass after being folded by the rolls. It will here be obvious that a pair of non-rotative polished plates may be substituted for the rollers 10 and 11, the plates being fixed at their ends in the sliding blocks 24 and 25.

From the idler folding rolls 10 and 11 the paper S passes around the guide roller 36 and thence around the guide roller 37 from which latter it passes through the folding unit B which is similar in all respects to the unit A except that it is of reduced size adapted to receive the once folded continuous sheet of paper S. The folding table 38 and folding rolls 39 are mounted on an adjustable sliding carriage carried by a bed plate secured to the frame members 1 and 2, all of construction similar to that just described for the unit A and mounted in inverted position to receive the upwardly moving continuous sheet of material.

From the folding rolls 39 of the unit B the twice folded stock passes upwardly over the roller 40 and into the third longitudinal folding unit C comprising the folding table 41 and folding rolls 42 which are similarly constructed and mounted as are the corresponding elements in the units A and B, except that they are again smaller and positioned to receive the reduced width of the stock passing from the unit C.

The thrice folded band of paper then passes over the roller 43 mounted in suitable bearings on the cross members of the upper portion of the frame, and from there passes into the cutting mechanism E. The latter is illustrated in enlarged detail in Figs. 5 and 6 and comprises a pair of rolls 44 and 45. The roll 44 has its shaft 46 journalled in fixed bearings 47 mounted on the upper surfaces of the frame members 1 and 2. The roll 44 carries at diametrically opposite points in its periphery a pair of adjustable cutting knives 48 extending longitudinally of the surface of the roll. The knives 48 are positioned in longitudinal recesses in the roll 44, and are adapted to be moved outwardly from the recesses so that their cutting edges may be adjusted in the extent to which they protrude from the recess. The outward positioning of the knives is effected by set screws 49 carried by the recess wall and forming a rest for the inner edges of the knives. Each knife is secured in position against the radial side wall of its recess by means of a filler block 50 cooperating with a wedge piece 51, the filler block being secured to the roll by bolts 52.

The roll 45 is of like diameter with the cutting roll 44 and is also provided with longitudinal recesses diametrically positioned in the periphery of the roll. Longitudinal strips 53 of resilient material suitably adapted to form a backing for the cutting edges of the knives 48 carried by the cutting roll, are centrally positioned in the recesses and secured therein by means of adjoining wedge-shaped strips 54 held in position by means of bolts 55. The outer surfaces of the strips 53 and the retaining members 54 conform to the cylindrical periphery of the roll 45. The roll 45 has its shaft 56 journalled at each end in swinging bearing arms 57 pivoted respectively upon a pair of eccentrics 58 rigidly mounted on a rotatably adjustable cross bar 111 journaled in the frame members 1 and 2. The axes of the bearings of the roll 45 and of the pivotal supports of the bearing arms 57 are parallel with the axis of the cutting roll 44.

The cutting roll 44 and its backing roll 45 may be varied in diameter by the substitution of other rolls so that any length of cut may be made in the paper stock passing between them. The swinging bearing arms 57 may be shifted longitudinally to accommodate the variable sizes of rolls and retain their line of contact in the same vertical plane, by adjusting the position of the eccentrics 58, thus compensating for the varying distances between the axial centers of the rolls of different sizes. The bearings 47 for the cutting roll shaft also may be shifted horizontally upon their supports.

Proper tension between the cutting roll and the backing roll is maintained by means of a pair of compression springs 56$^a$ carried on the outer portions of a pair of rods 56$^b$ pivoted respectively as at 56$^c$ to the frame members 1 and 2 and passing through the flattened ends 56$^d$ of the shaft 56. Each of the springs 56$^a$ is compressed between the washer 56$^e$ adjustably secured to the outer end of the rod 56$^b$, and the flattened end 56$^d$ of the shaft. The action of the springs tends to resiliently force the backing roll 45 into contact with the cutting roll 44 with such pressure as may be desired.

To maintain the cutting knives and backing strips in registering relation I have provided positive gearing connection between the two rolls comprising a pair of pinions 59 and 60 mounted on the respective roll shafts in fixed relation to the rolls, and intermeshing therewith a pair of gears 61 and 62 interengaging with each other. The latter gears are rotatable upon a pair of stub journals 63 carried respectively by an upward extension 64 of one of the bearing arms 57, and an arm 64$^a$ mounted on the cutting roll shaft 46. A connecting plate 64$^b$ secures the stub journals in spaced relation. The arrangement of the arms 64 and 64$^a$ compensates for the changes in distance between the axial centers of the rolls when different sizes of rolls are employed.

To assure against slippage of the cutting roll in relation to the paper stock passing thereover and thus making irregular the lengths cut by the knives, I have provided a pair of idler rolls 65 and 66 rotatable upon a pair of shafts secured at each end in a pair of supports 67. The idler rolls are supported in position above the cutting roll, and accommodated to the varying diameters of the interchangeable rolls, by means of the arm 67$^a$ having pivotal connection at its upper end with the shaft 67$^b$ carrying the idler roll 66, and pivoted at its lower end on an eccentric 67$^c$ rotatably mounted on the stationary backing roll shaft 56. The position of the eccentric relative to the arm 67$^a$ may be secured by a set screw 67$^d$. The idler rolls 65 and 66 support an endless belt 68 which is in contact over a substantial portion with the periphery of the cutting roll 44. The tension upon the endless belt may be adjusted by means of a sliding bearing 69 for the shaft of the roll 65, the roll shaft carrying at each end an eye bolt 70 having its threaded portion engaged through a lug 71 positioned on the support 67, and secured by means of a pair of lock nuts.

The weight of the idler rolls and the endless belt resting upon the surface of the paper stock S passing between the belt and the cutting roll causes sufficient friction to prevent slippage between the cutting roll and the paper, and mainly provides for the propulsion of the paper stock through the machine. When necessary to feed the paper through the rolls by hand as when starting operations, the idler rolls and their supports may be swung upwardly about the shaft 56 to uncover the cutting roll and permit the hand insertion of the paper stock.

The knives 48 are adapted by the position of their cutting edges to transversely sever into similar separate sections the three times folded paper stock passing over the roll. In my preferred arrangement a narrow central connecting portion or marginal portions at each side are left unsevered, the latter being left to retain the severed sections in end to end relation as they pass between and away from the rolls, for purposes hereinafter disclosed.

The folding units A, B and C and the cutting mechanism E accomplish the three longitudinal folds illustrated in Fig. 21 and partially sever the sections into individual napkins, or other articles being produced, preparatory to the transverse folding operation and the stacking and counting of the separate units.

As an aid in propelling the paper stock from the roll D through the several units described I have provided belt connections between the cutting roll 44, which is the main propelling means, and the guide rollers 36, 37 and 43, each of these carrying grooved pulleys of suitable diameter interconnected by belts 72, 73 and 74, the pulleys and belts being arranged to maintain the proper speed and direction in the rotation of the several guide rolls to carry the paper stock smoothly forward in taut condition without danger of rupture. The cutting roll 44 is driven by means of a sprocket chain 75 operating upon the sprocket 76 carried by the cutting roll shaft and driven from the sprocket 77 carried by the main driving shaft 78 mounted in the lower portion of the frame members 1 and 2.

As a suitable source of power for the operation of the machine I have employed in the present instance an electric motor 79 mounted on a suitable standard 80 carried by the frame members 1 and 2. For suitable speed reductions and variations I employ a step pulley 81 on the motor shaft belted to a large step pulley 82 mounted on the main drive shaft.

For the purpose of controlling the operation of the machine I have provided a clutch mechanism for throwing in and out of operation the operating parts of the machine. As illustrated in Fig. 16, the cone or step pulley 82 is loosely mounted on the main drive shaft 78 and is provided with a well known type of friction disk clutch mechanism carried in its hub 83, the driving element 84 of which is slidably mounted on the main shaft 78 being keyed thereto against rotation by the key 85. A hand lever 86 pivoted at 87 on a support 88 mounted on the frame member 2, carries a pair of pins 89 engaging the annular channel 90 in the driving member 84. The latter is normally forced inwardly upon the friction disk assembly for operative rotation of the cone pulley 82 by means of a coiled spring 91 having its abutment against the fixed bushing 92 secured on the main driving shaft. Operation of the hand lever serves to throw the friction clutch in and out of engagement and thus conveniently provides for the gradual acceleration of the operation rolls when starting the machine, a provision necessary to avoid tearing the paper stock as would occur with a sudden starting of the rolls.

After the paper has passed over the cutting roll and when partially severed as previously described into unit sections, the material passes downwardly into a flat conduit 93 (see Figs. 5 and 6). To assure the certain entry of the paper into the conduit I have provided for exhausting the air from the conduit at its opposite end by means of a rotary blower 94 (Fig. 1) of well known construction and having its rotor mounted on the motor shaft, the conduit 93 extending downwardly and horizontally to the intake of the rotary blower. The air current may be controlled by means of a valve 94ª placed in the conduit adjacent to the blower intake.

The conduit 93 leads the partially severed stock received at its open upper end into position for operation thereon by the transverse folding mechanism F. The latter comprises a pair of endless belts which are adapted to receive the sections of the paper stock from a lateral orifice 95 in the conduit 93, the paper sections being thrust through the orifice by means of a reciprocating blade 96 operating through a housing 97 carried by the side wall of the conduit opposite to the orifice 95.

The blade 96 is operated by means of a crank 98 rigidly mounted upon a rocker shaft 99 journaled upon the upper portion of the frame members 1 and 2. The extremity of the crank 98 forms a yoke 100 pivotally supporting between its arms a bushing 101 in which is adjustably threaded one end of an operating link 102 carrying the blade holder 103. Another arm 104 rigidly mounted on the rocker shaft 99 carries a pivoted roller 105 at its end which engages the periphery of a cam 106 rigidly mounted on the shaft 46 carrying the cutting roll. The contour of the cam member 106 is so arranged with relation to the position of the knives 48 in the cutting roll that the folding blade 96 will be thrust through its housing at the proper moment to engage each partially severed section of the paper stock at its center and force the latter through the aperture 95 for engagement by the transverse folding mechanism. The operating stroke of the crank 98 is effected by means of a tension spring 107 secured at one end by a fixed attachment to the frame member 2, as by the pin 108, and attached at its other end to an arm 109 rigidly mounted on the rocker shaft 99, the cam member 106 permitting the inward stroke of the blade 96 at the proper moment.

Upon being thrust through the aperture 95 the transversely folded center portion of each paper section is received between the two endless belts of the transverse folding mechanism F which are operating at a substantially greater peripheral speed than that of the paper stock passing through the conduit 93 from the cutting roll, and by reason thereof, the partially severed section is torn from the following section and carried forward as a separate unit.

The mechanism F is carried on an upright supporting plate 110 having its upper and lower ends respectively mounted on the cross bars 111 and 112 extending between the frame members 1 and 2. Mounted centrally of the supporting plate 110 is a revolving drum 113 carried by a shaft 114 having its bearing journalled in a laterally extending bearing portion 115 of the supporting plate 110. The outer end of the shaft carries a pulley 116 belted to the pulley 117 mounted on the main drive shaft 78. The ratio between the driving pulleys is such that the peripheral speed of the drum 113 is somewhat increased above the peripheral speed of the cutting roll 44.

Mounted upon the supporting plate inwardly and downwardly from the drum 113 are a pair of idler rollers 118 and 119 each rotating on pivots fixed to the supporting plate. An endless belt 120 passes over the two idler rollers 118 and 119 and over the drum 113. The tension on the belt may be adjusted by means of a third idler roller 121 pivoted on a swinging arm 122 which latter is mounted on a fixed pivot 123 carried by the supporting plate 110 and so arranged that the swinging arm may be tensioned by spring means to force the roller in contact with the endless belt. Above and outwardly of the drum 113 are mounted three other idler rolls 124, 125 and 126 each of which is rotatably mounted on a swinging arm 127, 128 and 129 respectively, carried on pivots fixed in the supporting plate. A second endless belt 130 is carried by the latter three idlers and passes over the revolving drum 113 in contact with the first endless belt 120, both belts being driven by the drum. The idler rollers 124 and 126 are each arranged with spring means for forcing them toward the fixedly positioned idler rollers 118 and 119, so that the two belts are in snug contact between the pair of idler rolls 118 and 124 and the pair 119 and 126. The spring means employed is illustrated in Fig. 2, wherein the coiled spring 131 has a fixed attachment at one end on the plate 110, and has its other end attached to the arm 129. The idler roll 125 is similarly tensioned to effect the desired tautness in the belt 130. The section of paper thrust through the orifice 95 is engaged by the two endless belts between the rollers 118 and 130, and passes over the drum and downwardly between the two rollers 119 and 126, being creased thereby along the transverse fold.

Upon emerging from between the belts at the lower point of their contact the napkin section is dropped into a chute 132 carried at the front end of a receptacle 133 adapted to receive and accumulate the completed folded napkins or other articles. Having been dropped into the chute each napkin is thrust rearwardly into the receptacle through a lateral opening in the chute by means of a shoe 134 (see Figs. 9 and 10), which reciprocates through an oppositely lateral opening in the front wall of the chute 132. The shoe is operated by a driving rod 135 having a sliding bearing in a support 136 carried by the frame members 1 and 2. The operating rod is actuated by means of cam mechanism carried by the main drive shaft and comprising two cam members 137 and 138, fixed on the drive shaft and respectively associated with the two rollers 139 and 140 pivoted in a yoke 141 fixed on the end of the operating rod. The two arms of the yoke have registering slots 142 through which passes the main drive shaft 78 and which confine the movement of the operating rod to longitudinal reciprocation with the revolution of the cam members. The cam members are arranged and timed to positively thrust inwardly the shoe 134 as each folded napkin drops to the bottom of the chute and withdraw the shoe to permit the entry of the succeeding napkin. The shoe may be provided with a guide rod 143 having a slidable bearing in the support 136 to prevent rotative movement of the shoe and its operating rod.

I have further provided a counting device for indicating the number of napkins stacked in the receptacle 133 by periodically raising a selectively numbered one of the napkins a substantial distance above the other napkins in the receptacle. This is accomplished by means of a vertically movable bottom 144 provided in the chute 132 which operates as a stop for the dropping napkin entering the chute. The position of the bottom or plunger 144 is determined by means of an operating bar 145 extending downwardly from the plunger (see Fig. 11) and suitably supported in a slideway 146 secured to the bottom of the chute.

One arm of a bell crank 147, pivoted on a bracket 148 attached to the frame member, engages a slot 149 in the bar 145 and actuates the plunger 144 in its movement in the chute. A coiled spring 150, having a fixed abutment 151 on the bracket 148, bears against the under side of the bell crank, and tends to force it and the plunger upwardly. A bolt 152, threaded into the spring abutment 151, extends through the spring and through an aperture in the bell crank, the head of the bolt serving as a stop for the upward movement of the crank. The other arm of the bell crank 147 carries a yoke 153 which straddles the driving rod 135. A pin 154, fixed in the latter, is positioned to engage the arms of the yoke with the inward stroke of the rod and swing the bell crank against the spring 150 to lower the plunger in the chute.

The bar 145 is provided at its end with a hooked portion 155 cooperating with a bent lever 156 having an interlocking latch 157 on one arm which engages the hook 155 and normally holds the upper surface of the plunger in alinement with the bottom of the receptacle 133. The bent lever is pivoted upon a portion of the fixed bracket 148. The latch 157 is urged into locking engagement with the hooked end of the plunger bar by means of a spring 158 secured to the other arm 159 of the bent lever 156 and having fixed attachment upon the bracket 148. The outer end of the lever arm 159 is adapted to cooperate with a cam member 160 having a peripheral projection 161 which with each revolution of the cam member engages the end of the arm 159 forcing it downwardly and releasing the plunger bar from the latch 157 to be thrust upwardly by the spring actuated bell crank 147. When in this position the shoe 134 forces the napkin then in the chute, and which is raised substantially above the position of the preceding napkin, into the receptacle where its upper end stands prominently above the adjoining napkins.

The completion of the stroke of the shoe and its driving rod brings into engagement the cross pin 154 with the bell crank lever, thereby operating the latter to return the plunger to its normal position in alinement with the bottom of the receptacle, and permitting the reengagement of the interlocking latch members 155 and 157 until again released by another revolution of the cam member.

The operation of the cam member 160 is controlled by means of a gear 162 mounted in fixed relation with the cam member upon the common stub shaft 163, carried by the bracket 148. Intermeshing with the gear 162 is a pinion 164 fixed upon a shaft 165 journalled in the supporting bracket 148. A ratchet wheel 166 is also fixed upon the shaft 165 and is actuated by means of a pawl 167 pivoted in a block 168 fixed upon the driving rod 135. The pawl is adapted to engage the teeth of the ratchet wheel and revolve the latter with each forward movement of the driving rod. The rearward movement of the driving rod carries the pawl into position for reengagement over a varying number of teeth controlled by means of an arm 169 pivoted on the shaft 165, and adjustably positioned by being clamped by suitable means to a fixed arm 170. The arm 169 carries an angular flange 171 interposed between the pawl and the teeth of the ratchet wheel.

By shifting the position of the arm 169 and its flange, the pawl is permitted to operatively engage only one or two or more teeth of the ratchet wheel as may be desired. It will be obvious that the number of teeth moved forward with each reciprocation of the pawl determines the speed of revolution of the cam member, and also that the speed of the latter may be further varied by changing the relative diameters of the gear and pinion 162 and 164. By this means it is possible to provide for the raising periodically of any desired recurring numbered napkin.

To prevent the continued operation of the counting device in case of a break in the paper stock passing into the cutting mechanism I have provided a device illustrated in detail in Figs. 7 and 8 and positioned between the roller 43 and the cutting roll 44. A plate 172, having upstanding lateral sides, is adapted to receive the passing paper on its body portion and guide the paper between the side portions. The plate serves the double purpose of accurately guiding the material in proper position on the periphery of the cutting roll and also for releasing the counting mechanism in case of a break. The plate is hinged at one end upon a pin 173 carried in an angle bracket 174 adjustably supported upon the top portion of the frame members 1 and 2. A spring 175 is coiled about the pin 173 and has a portion engaging the under side of the plate which is so tensioned as to force the plate upward. The tension is gauged so that the plate is held down in approximately horizontal position by the paper material passing over it, but in case of a break the spring urges the plate upward on its hinge and carries with it a connecting wire 176 attached to the free end of the plate. The wire runs down to the counting mechanism, having its other end secured to a pivoted element 177 engaging the under side of the ratchet operating pawl 167, and normally resting upon the flange 171. With the upward movement of the plate 172 the operating pawl is lifted and held free of the ratchet wheel 166 thus failing to actuate the latter upon the continued reciprocation of the driving rod 135.

In Fig. 17, I have illustrated a modification of my machine in which is incorporated a second transverse folding mechanism designated generally at F'. The latter is essentially a duplicate in its operating parts of the first folding mechanism F. To accomplish its operation and auxiliary conduit 93ª opens beneath the discharge end of the cooperating endless belts 120 and 130 to receive the napkins passing therethrough. The conduit 93ª is joined in with the conduit 93 the air being exhausted therefrom by the blower 94 and serving to draw the napkins into position to be again transversely folded by the blade 96ª operating similarly to the blade 96 and actuated by a crank 98ª. A cam member 106ª mounted in fixed concentric relation with the drum 113 controls the rocker arm 104ª which in turn actuates the crank 98ª. The drum 113ª carrying the two endless belts 120ª and 130ª is driven by belt connections with the drum 113.

After passing through the second transverse folding mechanism the napkins are dropped into the chute 132 and stacked in the receptacle 133 in the manner previously described, the stacking and counting mechanism being actuated by the driving rod 135 and the cam mechanism assembled about a shaft 78ª similar in all respects to that previously described. The shaft 78ª is driven from the main drive shaft 78 by means of suitable belt connections. To accommodate the additional folding mechanism the frame members 1 and 2 may be constructed with downward extensions 1ª giving sufficient depth to the framework to suitably support the operating parts above the bay of the machine.

It is to be understood that, if desired, the napkins instead of being partially severed may be completely severed as they pass between the rolls 44 and 45. In either event, I preferably provide means in the conduit 93 adapted to support the napkins in proper position for engagement by the blade 96, this means serving in the one case merely as a safeguard in the event of accidental severance. In the present instance such means is shown (Fig. 5) in the form of a screen 178.

While I have illustrated and described in detail a preferred embodiment of my invention, it should be clearly understood that the disclosure is merely for the purposes of illustration and that many modifications and variations will naturally occur to those skilled in the art. I aim in the subjoined claims to cover all such legitimate variations and modifications.

I claim as my invention:—

1. A machine of the class described comprising, in combination, means for longitudinally folding a continuous web, means for cutting the longitudinally folded web to divide it at regularly spaced intervals, means for imparting a transverse fold in the web substantially centrally of the divisions formed therein by said cutting means, and pneumatic means tending to move the web into position with respect to said transverse folding means.

2. A machine of the character described comprising, in combination, means for imparting a longitudinal fold to a web, cutting means for partially severing the folded web into sections of regular length, means for transversely folding and separating said sections, and pneumatic means tending to present said sections successively to said transverse folding means.

3. In a machine of the class described, a plurality of folding devices effecting successive longitudinal folds in a passing sheet, interchangeable pairs of cutting rolls adapted to cut said sheets into sections of variable length, and means for effecting successive transverse folds in said sections.

4. In a machine of the class described, means for longitudinally folding a running sheet of paper, means for cutting said sheet into regular sections, means for transversely folding said sections, mechanism for stacking and counting said sections, and a device for rendering said counting mechanism inoperative upon the disruption of said running sheet.

5. In a machine of the character described, means adapted to fold longitudinally a running sheet of paper, cutting means adapted partially to sever said folded sheet into sections, a conduit adapted to receive said folded and partially severed sheet, means for transversely folding and completely separating the sheet including a member reciprocable transversely of the conduit, said conduit having apertures in opposite sides thereof to receive said reciprocating member, means adapted to grip the sections of the sheet when thrust laterally by said reciprocating member from said conduit, and means for creating a partial vacuum in the conduit whereby to tend to move the folded sheet to present said sections successively to said transverse folding means.

6. In a machine of the class described, means for longitudinally folding a running sheet of paper, cutting means adapted to partially sever the folded sheet into sections, means for completely severing and transversely folding said sections, a conduit having an open end positioned to receive said folded sheet from said cutting means, means for creating an air current through said conduit entering said open end to guide said sheet thereinto, and a reciprocating blade arranged to thrust said sections laterally from said conduit into engagement with said transverse folding means.

7. In a machine of the character described, the combination of means for partially severing a sheet to divide it into sections, and means for transversely folding said sections and also separating them from adjacent sections, said means including a reciprocatory member, and means for gripping a bight of the sheet formed by said reciprocatory member.

8. In a machine of the class described, a series of devices for successively effecting longitudinal folds in a running sheet and mechanism adapted to sever said folded sheet into regular sections, said mechanism comprising a cutting roll having a stationary bearing support, knives regularly positioned in the periphery of said roll, a second roll having a swinging bearing support, resilient means tending to swing said second roll toward said cutting roll, the peripheries of said rolls being in juxtaposition to receive said folded sheet therebetween whereby said sheet is cut into regular sections and interconnected driving means for said rolls.

9. In a machine of the class described, a plurality of interchangeable pairs of rolls adapted to transversely cut a longitudinally folded running sheet, laterally slidable adjustable bearings for one roll of said pairs, laterally swinging bearing supports for the other roll of said pairs, and a fixed conduit adapted to receive the partially severed sections of said folded sheet positioned beneath the line of contact of said rolls.

10. In a machine of the class described, a series of folding devices adapted to effect successive longitudinal folds in a running sheet, a cutting roll having regularly spaced peripheral knives adapted to partially sever said folded sheet into sections, a backing roll bearing against said cutting roll and forcing said folded sheet into engagement with said knives, a pair of spaced idler rolls mounted above said cutting roll, both idler rolls being swingable as a unit about an outside point and one also being swingable about the axis of the other and a belt running on said idler rolls and normally resting upon said folded sheet passing over said cutting roll to prevent slippage of said sheet upon said cutting roll.

11. In a machine of the class described, means for longitudinally folding a running sheet, a cutting roll adapted to partially sever the folded sheet into sections, a conduit extending downwardly from said roll and receiving said sections and having a lateral aperture with curved flanged edges, means for successively thrusting the center portions of said sections through said aperture, and a pair of endless belts having a portion of their running surfaces in contact with each other, said belts operating at greater surface speed than the peripheral speed of said cutting roll and adapted to receive the said partially severed sections between their contacting surfaces, thereby completely severing the successive sections and imparting a transverse fold thereto.

12. In a machine of the class described, means for folding a running sheet of paper longitudinally, means for cutting said folded sheet into sections, a conduit extending downwardly from said cutting means to receive said sections, said conduit having a lateral aperture at a substantial distance from said cutting means, a transverse folding mechanism including a pair of partially contiguous belts each running on a set of idler rolls so as to provide a tensioned surface contact directly alined with said aperture, and means reciprocating transversely of said conduit to thrust the medial portion of each of said sections through said aperture and between said belts.

13. In a machine of the class described, means for longitudinally folding a running sheet, cutting means adapted to cut said folded sheet in regular sections, a revolving drum, a plurality of idler rolls, a pair of endless belts running on said rolls, and said drum, said idler rolls being relatively positioned so that a substantial portion of the surfaces of said belts meet in tensioned contact and run over the periphery of said drum in superimposed relation, swingable bearing supports for certain of said idler rolls, resilient means tending to swing said supports to exert longitudinal tension upon said belts, a conduit receiving said sections from said cutting means, and means for successively introducing the center portions of said sections between said endless belts.

14. In a machine of the class described, means for folding a running sheet of paper, a cutting roll receiving said sheet from said folding means and adapted to cut said sheet into sections, a spring pressed hinged plate guiding said running sheet to said cutting roll, said plate being arranged to swing upwardly with the failure or disruption of said sheet running thereover, a device adapted to receive and stack said sections, counting mechanism arranged to elevate regularly recurrent ones of said sections when stacked, and a connection between said plate and said counting mechanism whereby the later is rendered inoperative by the upward wing of said plate.

15. In a machine of the class described, a series of folding devices adapted to effect successive longitudinal folds in a running sheet of paper, cutting means for severing said folded sheet into sections, a receiving conduit for said severed sections, and means for producing a partial vacuum in said conduit.

16. In a machine of the class described, means for dividing into sections a continuous sheet of material, means for folding said sections, and a conduit having an air current therethrough, said conduit being arranged to transmit said sections from said dividing means to said folding means.

In testimony whereof, I have hereunto set my hand.

PETER D. PAULS.